Patented Jan. 30, 1923.

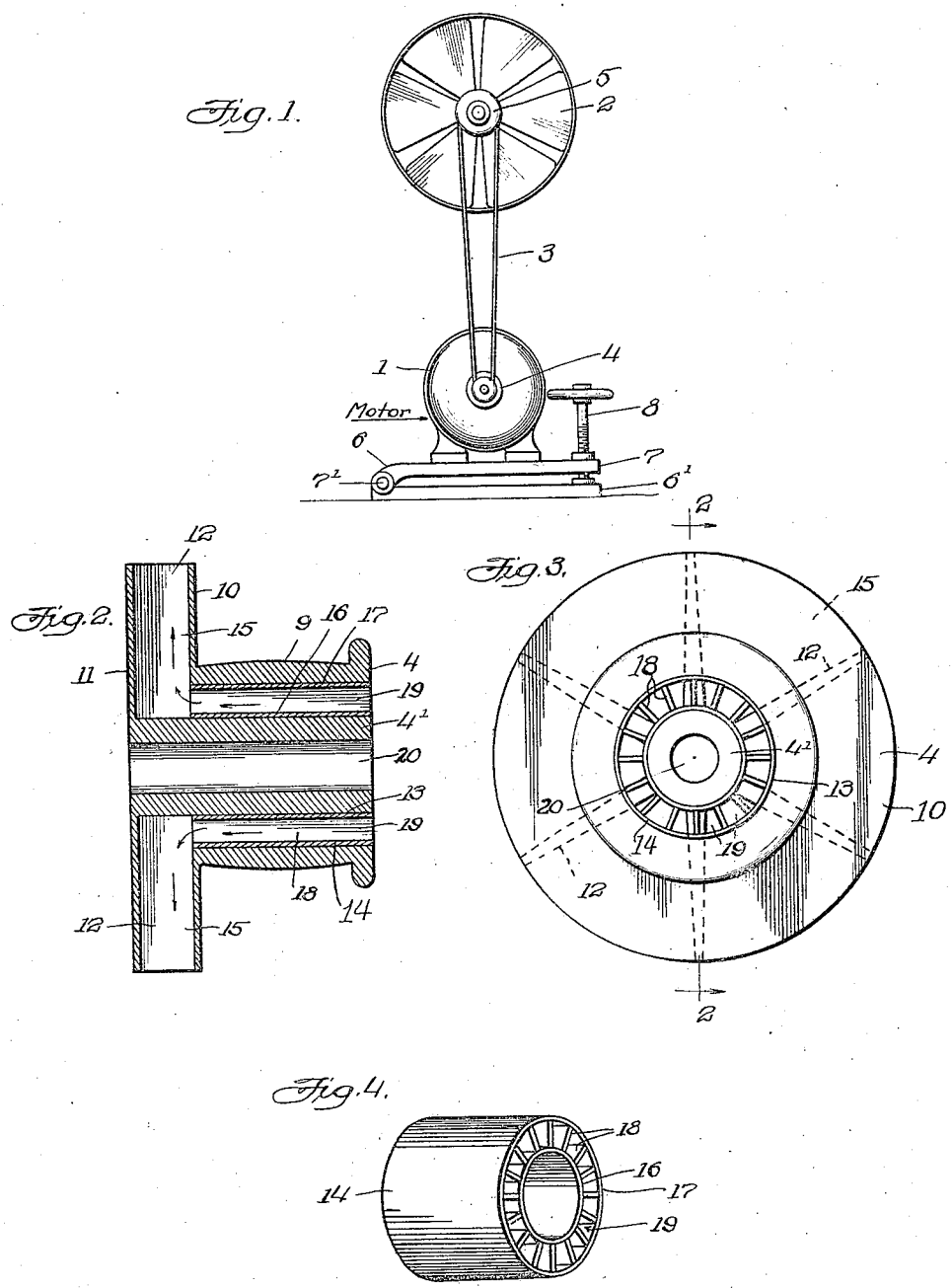

1,443,541

UNITED STATES PATENT OFFICE.

AUSTIN KIMBLE, OF WAUSAU, WISCONSIN, ASSIGNOR TO MARATHON ELECTRIC MFG. CO., OF WAUSAU, WISCONSIN, A CORPORATION OF WISCONSIN.

VENTILATED PULLEY.

Application filed May 12, 1921. Serial No. 468,933.

*To all whom it may concern:*

Be it known that I, AUSTIN KIMBLE, a citizen of the United States of America, and a resident of Wausau, county of Marathon, and State of Wisconsin, have invented certain new and useful Improvements in Ventilated Pulleys, of which the following is a specification.

This invention relates primarily to air-cooled and artificially ventilated power transmission pulleys, and indirectly to speed regulation of belted motor-driven devices and means to manually adjust regulation of the speed of a driven device by means of variable belt tension, especially in connection with constant speed motors such for instance as alternating current motors of either synchronous or induction type.

The main objects of the invention are to provide an improved form of draft generating and self ventilated pulley combining in a high degree mechanical strength and heat conductivity, to provide such a pulley adapted for high speed, and having sufficient heat conductivity and radiating power to avoid overheating when subjected to extensive belt slippage; to provide such a pulley in a form adapted to intimately relate the cooling draft to its interior; and to provide a high speed motor with such a heat dissipating pulley adapted to prevent accumulation and transmission of heat to and consequent overheating of the motor.

This invention is distinguished as to structure from the device of my Patent No. 1,372,700 of March 29, 1921, and from my two copending applications having the Serial Nos. 464,029 and 1,388,865, and the appended claims are limited to the present disclosure as distinct from said patent and other applications.

An illustrative embodiment of this invention is shown in the accompanying drawings, in which—

Fig. 1 is a front elevation of a belt-connected motor and fan, with a manual belt tightener on the motor support.

Fig. 2 is an axial section of the motor pulley on the line 2—2 of Fig. 3.

Fig. 3 is an elevation of the draft intake end of the pulley.

Fig. 4 is a perspective view of a separately constructed cellular radiator member adapted to fit snugly between the hub and rim of the motor pulley.

In the construction shown in the drawings, the motor 1 is operably connected to the fan 2 by means of the belt 3, said motor being provided with a pulley 4, and the fan being provided with a pulley 5 to receive said belt. The motor is mounted on an adjustable frame 6 comprising a stationary base part 6' and a movable part of platform 7 adapted and arranged for vertical movement by adjustable means 8 in the form of a screw and hand-wheel, said parts 6' and 7 being hinged together at one side as indicated at 7'. The driven pulley is so related to the motor pulley that movement of the screw 8 varies the tension of the belt, as will be understood.

It will be apparent that if the motor is adapted for constant speed and the driven device is in the form of a fan or other constant load mechanism, the tension of the belt may be adjusted to run the driven device at any desired constant speed less than its maximum speed, and heat will be generated by belt slip friction on the pulley crown.

The self-ventilated draft generating pulley 4 comprises a hub 4', a crown rim 9 secured thereto as will be described, a radial flange 10 formed on the back side of rim 9, a radial flange 11 formed on the rear end of hub 4', and radial fan blades 12 disposed between said flanges 10 and 11. The blades 12 extend from the hub 4' to the outer edges of the flanges 10 and 11 and are cast integrally therewith and support the flange 10 and rim 9, the latter being in spaced relation to the hub 4' and concentric therewith to provide a housing and draft chamber 13 for the air intake and radiator member 14. A plurality of draft passages 15 extend from the inner end of chamber 13 and member 14 outwardly between said flanges 10 and 11 and between said blades 12.

The member 14 serves as a radiator proper and consists of a cellular cylinder having an inner wall 16 and an outer wall 17 connected by numerous thin webs or partitions 18 disposed radially to provide cells or passages 19. Said member 14 is made of heat conductive material such as copper or the like. It is preferably interchangeable. In operation a strong draft of air is drawn through the pulley and discharged radially past the blades 12 by centrifugal force. The operation is apparent from the drawings, and the direction of the induced draft current is indicated by arrows. The hole 20 is for the motor shaft.

The motor pulley is usually smaller than the driven pulley, and hence the slippage naturally occurs at the motor end of the belt, but in case the driven pulley is the smaller, the pulleys are made of such materials that slippage at the motor is assured, for which purpose the driven pulley may have the face of its rim formed of material offering greater surface friction than that of the motor pulley.

It is apparent that if the fan is adjusted for slow speed and correspondingly light load, the tension on the belt will be relatively small and consequently the bearing friction of the motor and fan will be correspondingly small, so that on light loads there is a saving of energy which would otherwise be lost through the bearings of a constantly tight-belted device.

Although but one specific embodiment of this invention is herein shown and described, it is to understood that numerous details of the construction shown may be altered or omitted without departing from the spirit of this invention so defined by the following claims.

I claim:

1. A pulley formed mainly of material having relatively low heat conductivity and provided with a heat radiator composed of material having relatively high heat conductivity, said pulley having a fan to induce a draft adjacent to said radiator for cooling the latter.

2. A pulley having a thinly disposed copper radiator formed and adapted to dissipate the heat generated at the rim from belt friction, said pulley also having a fan to ventilate said radiator.

3. A pulley comprising a hub, a surrounding rim spaced therefrom, a radiator disposed between said hub and rim, and means to induce a draft through said radiator.

4. In a pulley a hub and a rim, in combination with a cylindrical radiator interposed between said hub and rim, said radiator comprising a pair of concentric hollow cylinders and a series of radially disposed longitudinal web members connecting said cylinders.

5. A pulley radiator of perforated cellular character comprising a pair of thin wall members disposed concentrically in mutually spaced relation, with thin axially disposed webs connecting said members.

6. A pulley comprising hub and rim members disposed concentrically in spaced relation, mutually spaced flanges extending radially from said hub and rim respectively with centrifugal fan means carried thereby, and a cellular radiator disposed between said hub and rim and communicating at one end directly with the air and at the other end with said fan means.

Signed at Chicago this 9th day of May, 1921.

AUSTIN KIMBLE.